Nov. 17, 1942.  H. E. ANTHONY  2,302,166
DISPENSING APPARATUS
Filed Sept. 13, 1940  4 Sheets—Sheet 1
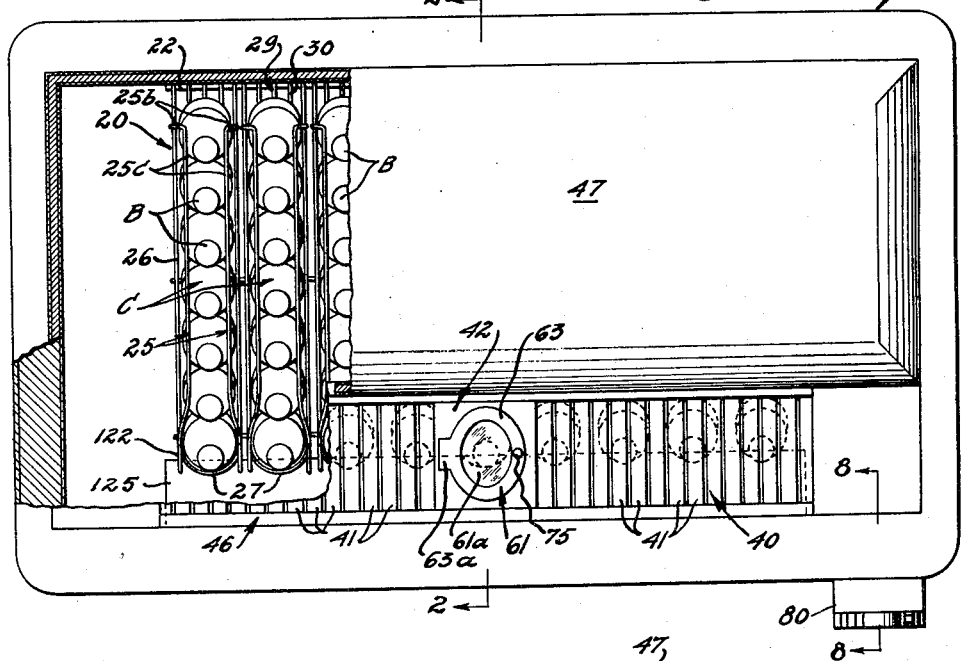
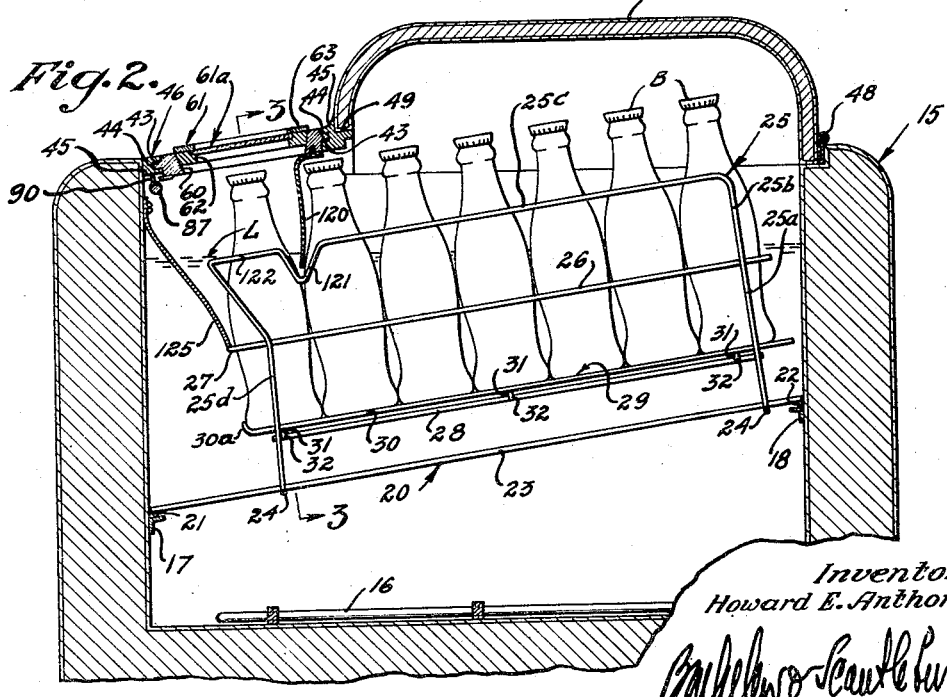
Inventor:
Howard E. Anthony.
Attorneys.

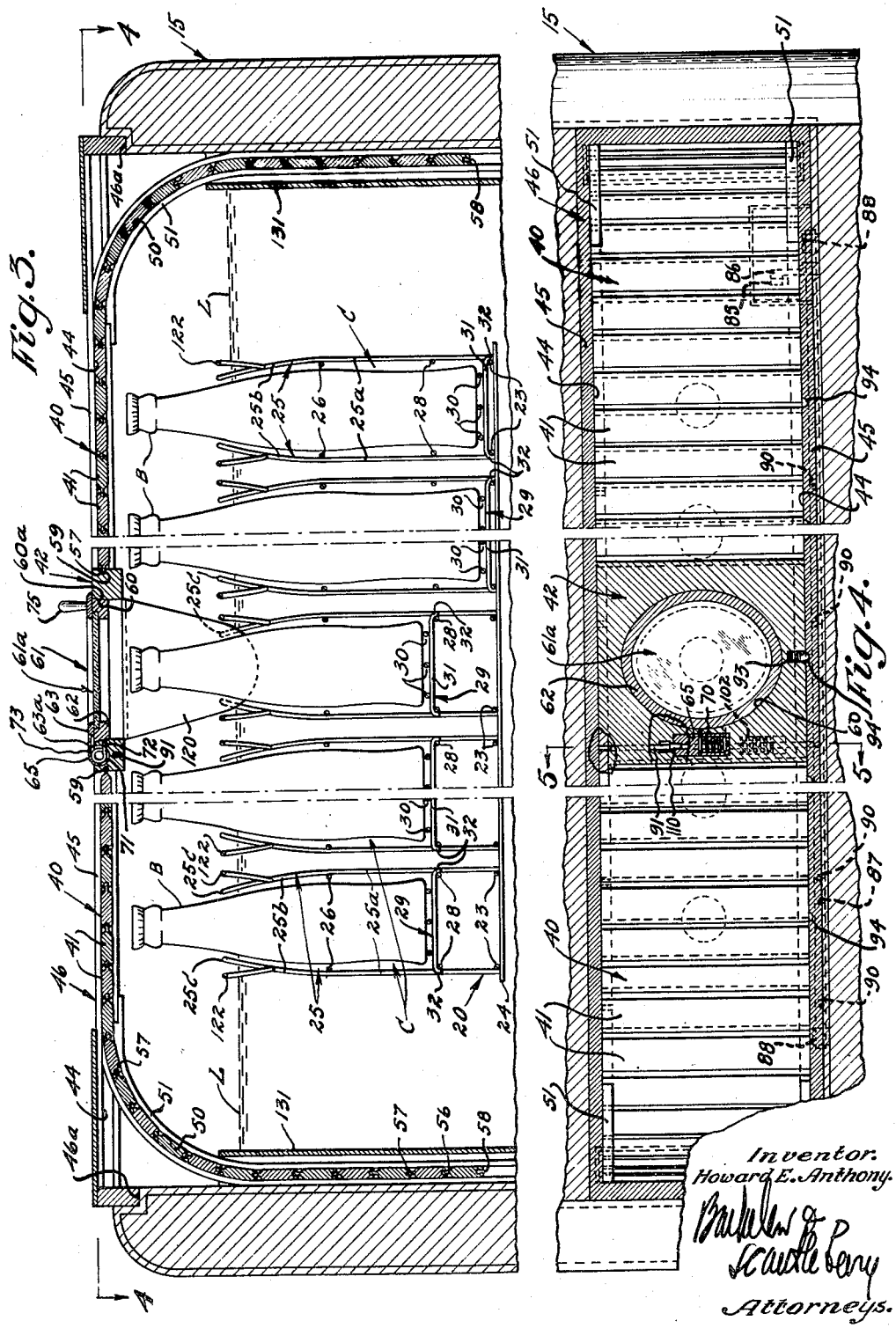

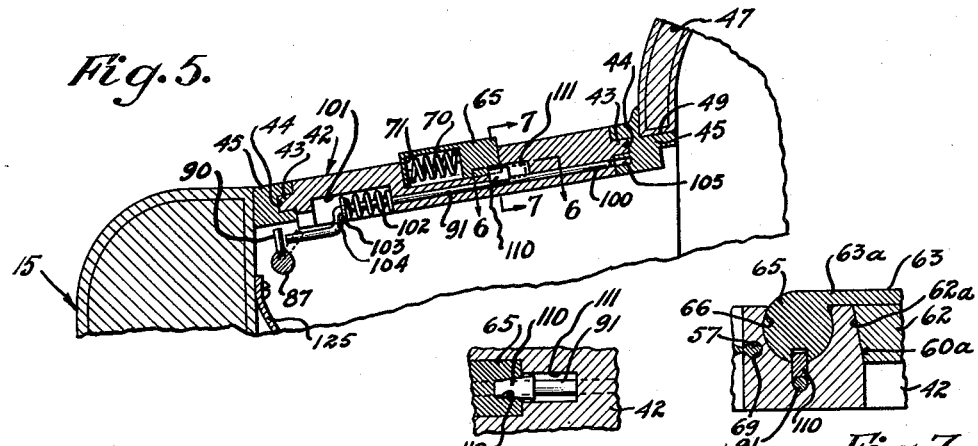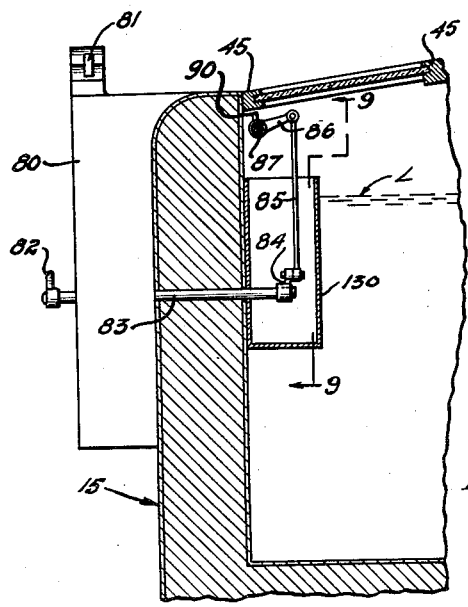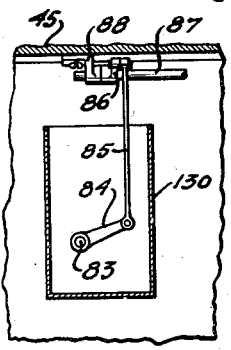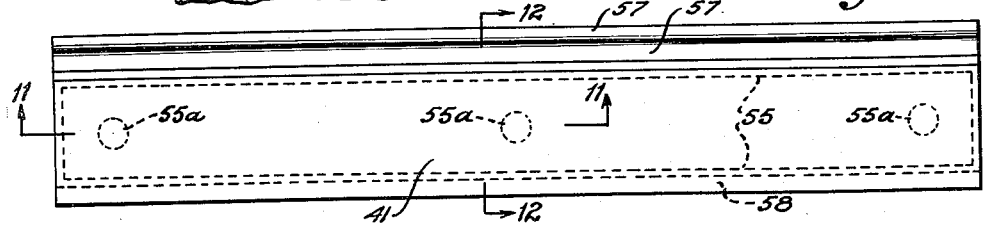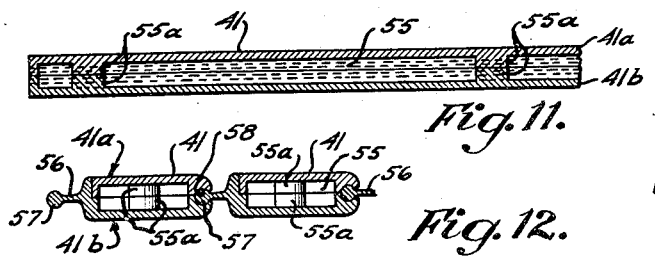

Nov. 17, 1942.   H. E. ANTHONY   2,302,166
DISPENSING APPARATUS
Filed Sept. 13, 1940   4 Sheets-Sheet 4
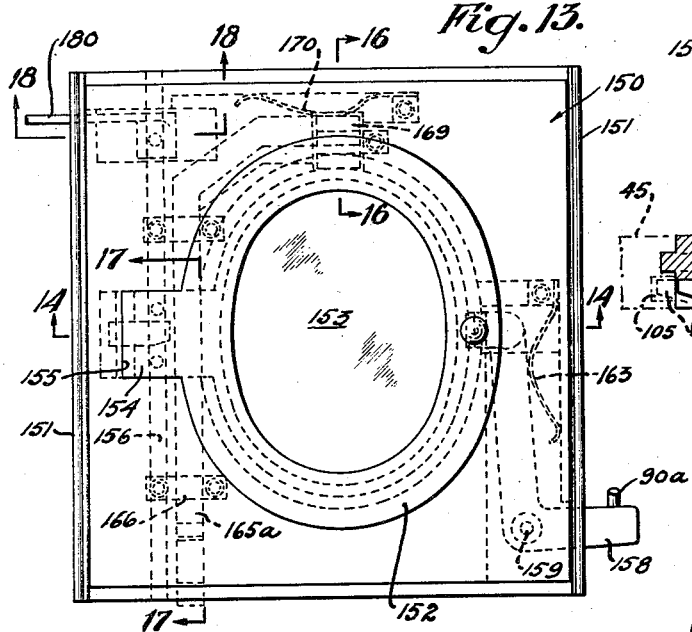
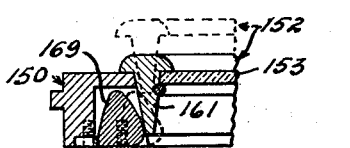
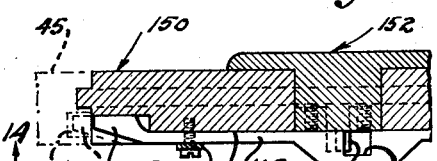
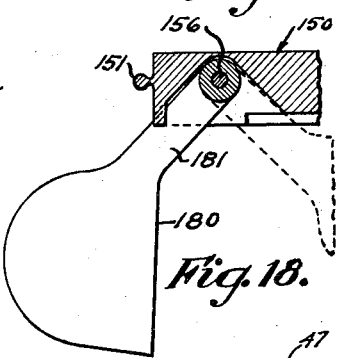
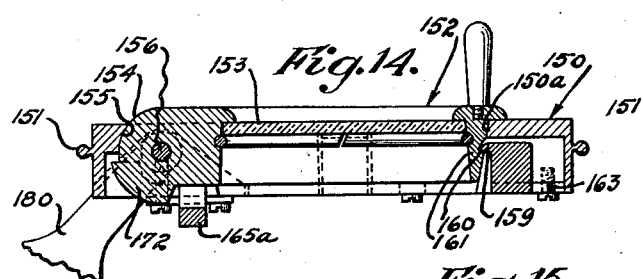
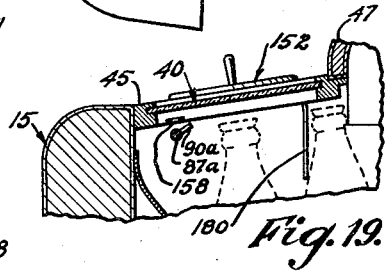
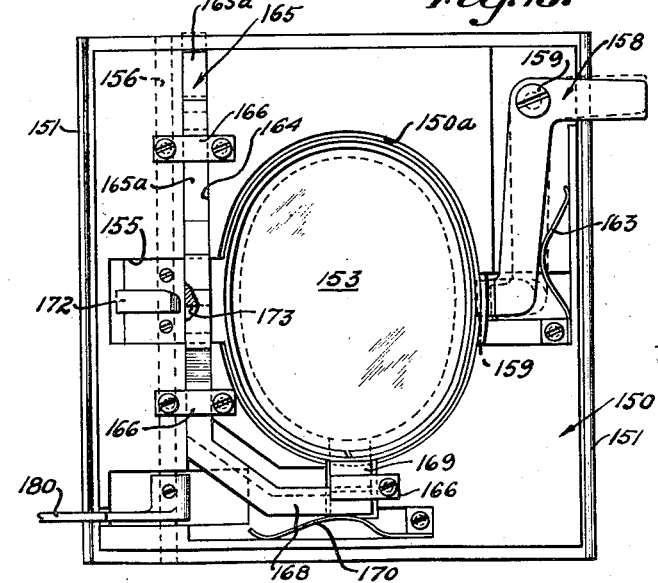
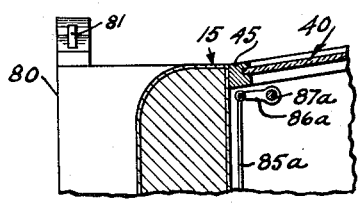
Inventor.
Howard E. Anthony.
Attorneys.

Patented Nov. 17, 1942

2,302,166

UNITED STATES PATENT OFFICE 2,302,166

DISPENSING APPARATUS

Howard E. Anthony, Los Angeles, Calif., assignor, by direct and mesne assignments, to Charles P. Dickinson, Los Angeles, Calif.

Application September 13, 1940, Serial No. 356,607

14 Claims. (Cl. 312—36)

This invention relates generally to dispensers for articles such as bottled beverages and the like, the particular present purpose of the invention being the provision of a coin-controlled apparatus for dispensing such articles as bottles and the like from a refrigerated chest and enabling ready selection by the customer from a number of displayed bottles containing different beverages.

It will be understood that the invention is not limited to dispensers for such things as bottles from refrigerators, but may be used for dispensing any type of article capable of being handled in the manners to be described. However, as the present from of the invention has been designed particularly for bottle dispensing, the invention will be described as for that use, but without limitation thereto.

The invention in its preferred and illustrative form provides a bottle rack mounted within a refrigerated chest, and formed to provide a plurality of parallel gravity chutes for the bottles. Each such row is intended to be stocked with bottles containing the same beverage, but the bottles of different rows may contain different beverages. The bottles at the lower ends of the several chutes thus contain different beverages, and these bottles form a row from which the customer makes his selection. In the top of the chest, directly over this last described row, there is provided a transparent, longitudinally slidable, inspection panel, through which the caps on the tops of the bottles may be viewed. Mounted in this transparent panel is a door frame fitted with a hinged door, and the door is provided with a transparent window, so that the bottle under it can be viewed. The transparent inspection panel is longitudinally moved over the row of bottles until the above mentioned door is in a position of registration with the particular bottle which it may be desired to remove. The door is normally locked in closed position, and may be opened by means of a coin controlled mechanism. The door having been opened, the selected bottle may be reached by the fingers and withdrawn. A feature of the invention is the provision of locking means automatically locking the sliding panel against longitudinal movement at the time the door is opened and preventing movement thereof until the door is again closed. Thus the panel is prevented from being moved to bring the open door into positions of registration with other bottles, such as would permit unauthorized extraction of the latter. The operation of closing the door results in automatically locking it, and at the same time unlocking the inspection panel for its longitudinal travel. The door unlocking mechanism can then be again operated only by the deposit of a further coin.

Various additional features and accomplishments of the invention will appear and be described in the course of the following detailed description of one present preferred illustrative embodiment thereof, reference for this purpose being had to the accompanying drawings, in which:

Fig. 1 is a plan view with parts broken away;

Fig. 2 is a transverse vertical section taken on line 2—2 of Fig. 1;

Fig. 3 is a section taken on line 3—3 of Fig. 2;

Fig. 4 is a section taken as indicated by line 4—4 of Fig. 3;

Fig. 5 is a section taken on line 5—5 of Fig. 4;

Fig. 6 is a detail section taken on line 6—6 of Fig. 5;

Fig. 7 is a detail section taken on line 7—7 of Fig. 5;

Fig. 8 is a section taken as indicated by line 8—8 of Fig. 1;

Fig. 9 is a section taken as indicated by line 9—9 of Fig. 8;

Fig. 10 is a detail elevation of a panel section;

Fig. 11 is a section taken as indicated by line 11—11 of Fig. 10;

Fig. 12 is a transverse section through a pair of articulated panel sections, taken in accordance with the plane 12—12 of Fig. 10;

Fig. 13 is a plan view of a modified door frame and door construction;

Fig. 14 is a section on line 14—14 of Fig. 13;

Fig. 15 is a bottom plan view of the device shown in Fig. 13;

Fig. 16 is a detail section on line 16—16 of Fig. 13;

Fig. 17 is a detail section taken on line 17—17 of Fig. 13;

Fig. 18 is a section taken on line 18—18 of Fig. 13;

Fig. 19 is a view similar to a portion of Fig. 2, but modified to suit the construction of Figs. 13 through 18; and Fig 20 is a view similar to a portion of Fig. 8, but showing a modification to suit the construction of Figs. 13 through 18.

Numeral 15 designates generally a cooler chest having conventional sheet metal and insulation wall construction, as indicated, and in the bottom of this chest may be located refrigerating coils 16 (Fig. 2).

Mounted inside chest 15, in the present instance on angle members 17 and 18 secured to its front and rear walls (Fig. 2), is an inclined bottle rack 20 designed to provide a plurality of parallel inclined gravity guideways or chutes C for rows of bottles B. Though these bottle chutes C may be made up in various ways, the construction here illustrated has certain features of advantage and will be described in some detail. Resting on the two angle members 17 and 18 are longitudinal rods 21 and 22, and secured to and extending between these rods 21 and 22 are pairs of parallel inclined rods 23 forming the bottom supporting members of the several chutes C, the members of each of these pairs being spaced apart by a distance approximately equal to the diameter of the bottle for which the chute is designed. Rods 23 are braced by transverse intermediate rods 24 parallel to rods 21 and 22 (Fig. 2). Mounted on rods 23 are guide rods 25. These guide rods 25 include rearward sections 25a, which extend upwardly at right angles from rods 23 from points near the rearward or elevated ends of the latter, and incline toward the bottles where the bottles are necked down at the top, as indicated at 25b. Extending forwardly from the upper end portions of rearward sections 25a, in parallelism with bottom rods 23, are longitudinal guide rail sections 25c, which serve to guide the upper or neck portions of the bottles, and the sections 25c join front or lower end sections 25d which extend downwardly and are connected at the bottom to bottom rods 23.

Below and parallel with rod sections 25c are the two legs of a U-shaped guide rod 26, which is connected to rod sections 25a and 25d, as shown, and has its loop end 27 at the lower end of the chute to limit downward travel of the bottles. Between and parallel with rods 26 and 23, and connected to rod sections 25a and 25d, are supporting rods 28.

The bottoms of the bottles rest on a slide or trackway 29 that may be supported either on rods 28, to accommodate short bottles, or on lower rods 23, to accommodate tall bottles (Fig. 3). This trackway comprises a plurality of longitudinal rods 30, and a plurality of transverse rods 31 connected to the bottoms of rods 30, the rods 31 having downturned ends 32 adapted to be hooked over the rods 23 or 28, as the case may be. The end portions of the lower of the transverse rods 31 engage the rod sections 25d, which thus support the trackway in position. It will be understood that these trackways 29 preferably are not permanently attached to the rods 23 or 28, but may be quickly installed in either location depending upon the height of the bottles at hand. The two outside longitudinal rods 30 of the slide are preferably joined and turned upwardly at the lower end of the trackway, as indicated at 30a, to provide a further stop for the bottles at the lower end of the chute.

The forward end portions of the upper guide rod sections 25c of each chute are bent apart, opposite the bottle which is at the lower end of the chute, to a separation distance equal to at least the full diameter of the bottle (Fig. 1), so that this lower bottle can be readily removed from the chute in an upward direction. See the parts of these guide rods numbered 122 in Figs. 1, 2 and 3, and whose further functions will be explained later. The chutes are loaded with bottles from the rear, and sufficient clearance distance is accordingly provided between the rod sections 25a and the back wall of the chest to permit this to be done.

The several bottle chutes C are thus loaded with bottles from the rear, and the bottles in each chute slide by gravity down the trackway 29, between the described guide rails. The bottom member of the row of bottles in each chute engages the loop end 27 of guide rod 26 and the upturned end 30a of slide 29, and the bottom bottles in the several chutes thus come to rest in a row which extends transversely of the rows of bottles in the chutes. Assuming that each chute is stocked with bottles containing one kind of beverage, but that the different chutes are stocked with bottles containing different beverages, the bottles of this transverse row formed by the bottom bottles of the several chutes will include all of the different beverages with which the chest is stocked. It is from this transverse row of bottles that the customer makes his selection.

A transparent, longitudinally slidable inspection panel 40 is mounted at the top of the chest directly over this last mentioned row of bottles, and the caps on the bottles of said row may be viewed and identified through this panel.

In the present illustrative embodiment of the invention, the panel 40 is flexible in character, so that it will follow a curved guideway, and preferably embodies a series of articulated transparent panel sections 41, together with a rectangular door frame 42 located mid-way of its length. Opposite end-edges of panel sections 41 and tongues 43 formed on the corresponding edges of door frame 42, are slidably received in longitudinal ways 44 formed in the longitudinal members 45 of a rectangular guide frame 46 which is mounted at the top of the chest. As here shown, the front longitudinal member 45 of this frame is positioned just inside the front wall of the chest, while its ends are supported by shoulders 46a on the end walls of the chest. Panel 40 and its guide frame 46 are preferably inclined at the same angle as the bottle chutes, as illustrated in Fig. 2.

The chest is furnished with a lid 47, hinged to the rear wall of the chest as at 48, and adapted to close against a seat 49 formed on the rearward longitudinal frame member 45, as clearly illustrated in Fig. 2. Any suitable locking device may of course be provided for locking lid 47 in closed position.

The ways 44 in the members 45 connect near opposite ends of the chest with ways 50 formed in guide members 51 which curve downwardly and guide the end portions of the inspection panel just inside the opposite end walls of the chest, as illustrated in Fig. 3. The necessary length of the chest is thus materially reduced.

Figs. 10, 11 and 12 show a preferred panel section construction in accordance with the invention. As illustrated, each panel section comprises two complementary halves 41a and 41b, preferably formed of a suitable transparent plastic material, the two halves being so shaped as to form an approximately rectangular hollow cell, and being cemented together along the illustrated juncture planes. The interior air space 55 thus provided increases the transparency of the panel, increases its heat insulation properties, and decreases its weight. In order to strengthen the panel sections and prevent warping, the inner sides of the two halves 41a and 41b are formed with engaging lugs 55a.

A thin tongue 56 projecting from one longitudinal edge of the panel section terminates in an enlarged cylindric tongue head 57. At the other longitudinal edge of the panel section there is formed, between the two halves 41a and 41b, a cylindric socket 58 adapted to pivotally receive the cylindric tongue head 57 of the adjacent panel section, all as will be readily understood from an inspection of Fig. 12. The panel sections are thus pivotally connected to one another, in such a way that they will travel readily around the curves in the guideway.

The door frame 42 is articulated to the adjacent panel sections 41 in the manner illustrated in Fig. 3, cylindric sockets 59 in its opposite edges receiving the cylindric tongue heads 57 on the adjacent panel sections 41.

Door frame 42 has an aperture 60, here shown as somewhat oval in form, and of a size such as will readily pass the largest bottle to be dispensed. This aperture 60 is normally closed by a hinged door 61 having a transparent window 61a. The door 61, as here shown, embodies oval shaped lower and upper plates 62 and 63, open in the center, and a transparent window plate 61a clamped between the two. The aperture 60 is formed to provide a downwardly tapering seat 60a, and the lower door plate 62 is complementarily tapered, as at 62a, and seats snugly on seat 60a.

Projecting from one side of upper door member 63 is a hinge embodying a shank 63a and a cylindric hinge part 65 formed below the latter. This cylindric part is mounted in a cylindric socket 66 sunk in door frame 42. This hinge enables door 61 to be swung upwardly to a position such as will enable a bottle directly below the aperture 60 to be grasped by the fingers and lifted out through said aperture.

The door 61 is spring actuated to open position by means of a coil spring 70 located in a recess 71 in cylindric hinge part 65, one end of this spring engaging a socket 72 formed in plate 42 and the other engaging a socket 73 formed between door members 62 and 63, as shown in Fig. 3.

Door 61 is however normally locked in closed position by a later described coin controlled mechanism. A handle 75 on door 61 is adapted to be grasped by the fingers and used to slide the door and the transparent inspection panel in a longitudinal direction until the transparent window in the door is alined with the bottle which it is desired to remove from the dispenser. It will be understood that the customer can view the caps on the entire bottom row of bottles through the transparent inspection panel, and that he merely slides the panel in one direction or the other until the window in door 61 is alined with the bottle which he selects. The coin controlled mechanism may then, after deposit of a coin, be operated to unlock door 61, whereupon the selected bottle may be removed.

Mounted on the front of the chest is a coin box 80 having a coin slot 81. An operating handle 82 at the front of the coin box is capable of rotating a horizontal shaft 83 projecting through the front wall of the chest when a coin has been deposited within slot 81, but is blocked against operation in the absence of a coin. Coin controlled mechanism of this type is well known and the mechanism within box 80 therefore need not be illustrated or described for present purposes. In coin controlled mechanism of this type, one operation only of shaft 83 is permitted after the insertion of a coin.

On the inner end of shaft 83 is an arm 84, which is connected by a link 85 to an arm 86 set on a horizontal rock shaft 87 located just below the forward guide member 45 for panel 40. Shaft 87 is journaled in bearings 88 secured to the underside of guide member 45 (see Fig. 9).

Shaft 87 is provided with a plurality of upwardly projecting studs 90, one for each bottle chute, the studs being spaced longitudinally of shaft 87 by a spacing interval equal to the spacing between bottles in the row below panel 40. These studs are adapted to engage and operate a push rod 91 mounted in door frame 42 immediately below and in alinement with the axis of hinge member 65. The end portion 92 of this push rod comes into register with a stud 90 of shaft 87 when door frame 42 has been moved into a position of registration with one of the bottles of the row from which the selection is made. To enable accurate registration, frame 42 is equipped with a spring-pressed detent 93 (see Fig. 4) received in sockets 94 spaced along one of guide members 45 when positions of registration are reached. The feel or click of this detent in moving into engagement with the sockets 94 enables the user to readily ascertain the exact positions of registration in which the door unlocking mechanism can be operated.

Push rod 91 is slidable through a bore 100 in frame 42. This bore opens at the end nearest shaft 87 to a recess 101, within which is located a coil spring 102 surrounding the push rod and acting between frame 42 and a washer 103 positioned by a downward offset 104 in the push rod. This spring 102 opposes movement of push rod 91 toward the right, as viewed in Fig. 5. The other or right hand end of push rod 91 is adapted to project from the edge of frame 42 into a socket 105 in the opposed guide member 45 to temporarily lock the frame 42 against sliding movement along guide members 45. It will be understood that there is a socket 105 in alinement with the end of push rod 91 for each position of registration in which the push rod may be actuated by a stud 90.

Mounted on top of push rod 91 is a locking element 110, preferably wedge shaped (see Fig. 6), which works in a rectangular recess 111 formed in plate 42. This recess 111 intersects the end of the cylindric hinge bore 66, and the wedge is adapted to engage in a wedge shaped notch 112 in the bottom of cylindric hinge part 65 when the door 61 is in closed position. The parts being in the position illustrated in Fig. 5, rotation of shaft 87 in a right handed direction causes stud 90 to engage push rod 91 and move the latter in a right handed direction, and such movement of the push rod moves the locking element out of engagement with notch 112 in hinge part 65 and to the clearance position indicated in dotted lines in the figure. At the same time the forward end of the push rod is advanced into engagement with socket 105. Door 61 is thus released and springs open, enabling the bottle directly below the door to be removed. As long as door 61 remains open, locking element bears against the end of hinge part 65, and the push rod therefore cannot return toward the left until the door is closed and the hinge notch again registered with the locking element. The push rod 91 hence remains in engagement with socket 105 at all times that the door is open, positively preventing the panel from being moved longitudinally at such time into positions in which other bottles might be removed. Closing of door 42, however, registers the hinge notch with locking element 110, and spring 102 then at once returns the push rod to the position of Fig. 5, locking element 110 entering hinge notch 112 and so positively locking the door hinge against movement.

It may be remarked that the several studs 90 may be replaced by a continuous fin extending along rock shaft 87, seeing that push rod 92 cannot be operated to unlock door 42 in any position except where rod 91 will enter a socket 105—which is only when the door is in registered position over a single bottle.

Secured to the bottom of door frame 42 is a depending guard plate 120, which fits in between the bottle at the lower end of a given chute and bottle next to it. This guard plate serves the purpose of preventing the second bottle on the chute from coming down and being reached and removed after the bottom bottle has been taken out. The second bottle, or bottle in back of the guard plate, is not permitted to slide down into the bottom position until after the door 61 has been closed and the panel 40 thereafter moved sufficiently to carry guard plate 120 out of line with the chute in question. As shown in Fig. 2, this guard plate 120 may preferably extend downwardly somewhat below the guide rod sections 25c, and the latter are accordingly here shown as formed with a downward V-bend at 121 to provide the necessary clearance.

The forward end portions 122 of guide rod sections 25c are extended somewhat beyond the bottom or forward bottles of the chutes, and serve as guards against removal of the bottom bottles in the two chutes next adjacent the chute over which the door is positioned at any given time.

A guard plate 125 secured to the inner surface of the front wall of the chest and extending over to the U-shaped member 26 of the bottle rack guides the bottle back into the chute in case it should slip out of the fingers during removal, and thus prevents it from falling down into the bottom of the chest and breaking.

The chest is intended to be filled with water, for instance up to the water line indicated at L in Fig. 3. To prevent this water from coming into contact with the shaft 83, arm 84 and link 85, said parts are surrounded by a sheet metal box 130 secured to the front wall of the chest, the upper edge of the box being located above the water line. The down-turned end positions of the articulated sliding panel are protected against the water by sheet metal pockets or compartments 131 secured to the ends of the chest (Fig. 3).

Briefly summarizing, the operations whereby a bottle may be selected and removed from the dispenser are as follows: Selection is made from among the bottles of the row underlying the transparent sliding panel 40, the caps on the bottles being plainly visible through the panel and through the window in the door 61. The door handle is then grasped and the panel moved until the door is in proper registration with the selected bottle, the exact positions of registration with the bottles of the row being readily found by the feel or click of the detent 93 as it passes the registration sockets 94. A coin is then deposited in the coin box, which permits shaft 83 to be operated once by handle 82. This operation rocks shaft 87, and causes the stud 90 of said shaft with which the push rod 91 of the door frame has been registered to move the push rod, thereby unlocking the door hinge, and at the same time locking the sliding panel against movement. The door then springs open, and the selected bottle may be reached by the fingers and withdrawn. Only this one bottle may, however, be removed, the guard plate 120 protecting the remaining bottles of the chute with which the door is registered, and the guide rod portions 122 protecting the bottom bottles of adjacent chutes. Moreover, the door cannot, while open, be moved into registration with other chutes, being positively locked against such movement until it has been closed. The door is automatically locked as it is closed, however, and the mechanism by which it may be opened can then not be again operated until another coin has been deposited.

Figs. 13 through 20 show a modification, in which the guard member 120 of the first described form of the invention is replaced by a guard member that swings into position only as the door is opened, and which swings out of position as the door is closed, so as to permit the row of bottles to slide down the chute and replace the bottle which has been withdrawn immediately when the door is closed. This obviates the necessity of sliding the panel to slide the door away from the selected row of bottles, when the customer wishes to obtain more than one bottle from one row.

Numeral 150 designates a modified rectangular door frame, which is adapted to be incorporated in the transparent articulated panel 40 of the dispenser; for instance, the end edges of frame 150 may be provided with tongue heads 151 (see Fig. 14) adapted to be coupled to the socketed edges of panel members 41, as will readily be understood.

Door frame 150 has oval shaped aperture 150a, closed by a corresponding shaped door 152, the latter having a central window 153 comprising a glass plate, as illustrated in Fig. 14. This door 152 has a generally cylindrical hinge part 154 received in a recess 155 in frame 150 and tightly mounted on a hinge pin 156 extending transversely through and journaled in frame 150. A bell crank 158 pivotally mounted at 159 on the under side of frame 150 has at the end of one of its arms a latch lug 159 (Fig. 14) adapted to engage with a recess 160 formed in the flange-like portion 161 of door 152 that projects downwardly through door aperture 150a. The other arm of bell crank 158 is adapted to be engaged and moved by studs 90a on a rock shaft 87a (Fig. 19), said rock shaft being operated by an arm 86a and link 85a (Fig. 20) understood to be operated in turn from an arm 84 and shaft 83 such as illustrated in Fig. 8. In the first disclosed form of the invention (Fig. 8), the rock shaft 87 and studs 90 carried thereby and rocked in a clockwise direction, as viewed in Fig. 8, to unlock the door; in the form of Figs. 13 to 20, the rock shaft 87a and stud 90a turns in a counterclockwise direction to actuate the bell crank 158 to unlock the door, and to accomplish this, the operating arm 86a is here shown as extending from the rock shaft in a direction opposite to that of the arm 86 of the form of Fig. 8. It will thus be understood that operation of the operating handle, after deposition of a coin, acts through a shaft and arm similar to shaft 83 and arm 84 of Fig. 8 to move link 85a of Fig. 20 in a downward direction, thereby rocking shaft 87a in a counterclockwise direction, and moving stud 90a against the associated arm of bell crank 158 to swing the latter from the full to the dotted line position of Fig. 15. This removes latch lug 159 from locking recess 160, and permits the door to swing open.

Latch lug 159 is normally urged to latching position, as by flat spring member 163 acting on bell crank 158, in the manner indicated in Fig. 15. The depending flange part 161 of the door, in which the locking recess 160 is formed, is downwardly tapered, as illustrated in Fig. 14, and it will be understood that the engagement of part 161 with latch lug 159 will depress the latter against spring 163 until recess 160 registers with lug 159, whereupon spring 163 will force lug 159 into recess 160 and therefore positive locking engagement with door 152.

Slidably mounted in a transverse way 165 formed on the underside of frame 150, under the door hinge, is a panel-locking bar 165a, straps 166 secured to the frame supporting said bar within way 164. This bar 165a is adapted to be projected from its full-like retracted position of Figs. 15 and 17 to the dotted line position of said figures in which its end portion 165b is projected from the frame and engaged in a recess or socket 105 of one of the frame members 45 in which member 120 is longitudinally slidable.

The other end of bar 165a has a laterally projecting arm 168, on which is formed a cam lug 169 bearing on the downwardly tapering depending flange 161 of door 152 (Fig. 16). A spring, here a flat spring 170 acting on the laterally projecting arm 168 of bar 165a, urges bar 165a to move from its full line retracted position to its dotted line projected position, and the engagement between door portion 161 and cam lug 169 normally supports said bar in its full line retracted position against the action of this spring. When door 152 is unlatched, however, the pressure of cam lug 169 on downwardly tapered part 161, resulting from the action of spring 170, causes the door to be cammed upwardly and thus opened. Such upward movement of the door permits lug 169 and bar 165a on which it is mounted to move from the full line to the dotted line positions of Figs. 15 and 16. Thus the result of unlatching door 152 is that the door is immediately cammed open and the door frame and the inspection panel are immediately locked by bar end 165b against longitudinal movement.

Provisions are made for positively holding bar 165a in its advanced or locking position while door 152 is in open position. As here shown, a lug 172 formed on the underside of hinge part 154 moves within an aperture 173 in bar 165a, said aperture coming into register with lug 172 when the bar reaches its advanced or locking position. The possibility that locking bar 165a might be moved manually to unlock the frame at a time when door 152 is open by exerting pressure on cam lug 169 is thus removed.

As the door is closed, lug 172 withdraws from aperture 173 in bar 165a and then engagement between door part 161 and lug 169 causes retraction of bar 165a to unlock the door frame for longitudinal movement. The parts are so arranged that locking bar 165b does not release door frame 150 until the door is fully closed, and when the door is fully closed, latch lug 159 locks it closed, so that by the time the door frame is freed for longitudinal movement, the door is again locked.

A guard plate 180 has a supporting arm 181 which is tightly mounted on hinge pin 156 (Figs. 15 and 18). When door 152 is closed, this guard plate 180 stands in the position indicated in full lines in Fig. 18, where it is out of alinement with the row of bottles with which the door 152 is registered. As the door is swung open, however, the rotation of hinge pin 156 swings guard plate 180 over into position between the bottom bottle of the row and the bottle next to it, so as to prevent the bottles of the row above the bottom bottle from coming down while the door is open. This guard plate 180, the same as guard plate 120 in the form of the invention disclosed in Figs. 2 and 3, thus prevents the bottles of the chute from coming down immediately upon withdrawal of the bottom bottle, and so prevents more than one bottle from being withdrawn by the customer for each opening of the door. The form of Figs. 13 to 20 has the additional advantage, however, that the guard plate is automatically removed from alinement with bottles of the row when the door is closed, so that the bottles can then come down and replace the withdrawn bottle. A second bottle from the same chute can then be obtained without further longitudinal movement of panel 40 (which is necessary in the first described form to remove the guard plate from the chute and so permit the bottles to come down) simply by deposition of an additional coin and actuation of operating handle 82.

I have now described particular forms in which the invention may be embodied in practice; it will be understood, however, that this is merely for illustrative purposes, and that various changes in design, structure and arrangement may be made without departing from the spirit and scope of the invention or of the appended claims.

I claim:

1. In an article dispenser which is adapted to support articles in a longitudinal row of such articles, a transparent longitudinally slidable inspection panel arranged in alinement with said row of articles, an aperture in said panel through which an article may be removed when the aperture is alined with the article, a door for said aperture hinged to said panel, a locking element movable into locking engagement with said door when said door is in closed position, a panel locking element movable to lock said panel against longitudinal movement, manually operable means for removing said door locking element from locking engagement with said door and moving said panel locking element to lock said panel against longitudinal movement, and spring means for moving said door locking element into locking engagement with said door and moving said panel locking element to unlock said panel when the door is moved to closed position.

2. In an article dispenser which is adapted to support articles in a longitudinal row of such articles, a transparent longitudinally slidable inspection panel arranged in alinement with said row of articles, an aperture in said panel through which an article may be removed when the aperture is alined with the article, a door for said aperture hinged to said panel, a locking element movable into locking engagement with said door when said door is in closed position, a panel locking element movable to lock said panel against longitudinal movement, said panel locking element being supported out of panel locking position when said door is in closed position, manually operable means for removing said door locking element from locking engagement with said door, spring actuated means for moving said panel locking element to lock said panel when said door is opened, and moving said panel locking element to lock said panel against longitudinal movement when the door is moved to closed position.

3. In an article dispenser which is adapted to support articles in a longitudinal row of such articles, a transparent longitudinally slidable inspection panel arranged in alinement with said row of articles, an aperture in said panel through which an article may be removed when the aperture is alined with the article, a door for said aperture hinged to said panel, a locking element movable into locking engagement with said door when said door is in closed position, a panel locking element movable to lock said panel against longitudinal movement, said panel locking element being supported out of panel locking position by means movable with said door when said door is in closed position, manually operable means for removing said door locking element from locking engagement with said door, spring actuated means for moving said panel locking element to lock said panel when said door is opened, and moving said panel locking element to lock said panel against longitudinal movement when the door is moved to closed position.

4. In an article dispenser which is adapted to support articles in a longitudinal row of such articles, a transparent longitudinally slidable inspection panel arranged in alinement with said row of articles, an aperture in said panel through which an article may be removed when the aperture is alined with the article, a door for said aperture hinged to said panel, said door having a hinge element pivotally mounted in said panel, a locking element movable toward and from a position of locking engagement with said hinge element, said hinge element having a formation engaging and holding said locking element out of locking engagement therewith while the door is in open position but permitting movement of said locking element into locking engagement therewith when the door is in closed position, manually operable means for moving said locking element out of locking engagement with said hinge element, and a spring acting to move said locking element into locking engagement with said hinge element.

5. In an article dispenser which is adapted to support articles in a longitudinal row of such articles, a transparent longitudinally slidable inspection panel arranged in alinement with said row of articles, an aperture in said panel through which an article may be removed when the aperture is alined with the article, a door for said aperture hinged to said panel, said door having a hinge element pivotally mounted in said panel, a locking element movable toward and from a position of locking engagement with said hinge element, said hinge element having a formation engaging and holding said locking element out of locking engagement therewith while the door is in open position but permitting movement of said locking element into locking engagement therewith when the door is in closed position, a panel locking element movable to lock said panel against longitudinal movement, manually operable means for moving said door locking element from locking engagement with said hinge element and also moving said panel locking element to lock said panel against longitudinal movement, and spring means for moving said hinge locking element into locking engagement with said hinge and moving said panel locking element to unlock said panel when said door is moved to closed position.

6. In an article dispenser which is adapted to support articles in a longitudinal row of such articles, a transparent longitudinally slidable inspection panel arranged in alinement with said row of articles, an aperture in said panel through which an article may be removed when the aperture is alined with the article, a door for said aperture hinged to said panel, said door having a cylindric hinge element pivotally mounted on said panel, a push rod mounted on said panel for movement transversely of the panel, a hinge locking element on said push rod, a spring urging said push rod to move in a direction to engage said hinge locking element with said hinge element, said hinge element supporting said locking element and push rod in an advanced position against the pressure of said spring when the door is in open position, and said hinge element having a recess which registers with said locking element when the door is in closed position and allows said push rod and hinge locking element to move to a retracted position with the locking element in locking engagement with the hinge element, a stationary frame means located adjacent a longitudinal edge of said panel, said frame means having sockets spaced longitudinally of said panel and adapted to receive a projecting end portion of said push rod when the push rod is moved to said advanced position, whereby the panel is locked against longitudinal movement, and manual means for moving said push rod from said retracted position to said advanced position.

7. In an article dispenser which is adapted to support articles in a longitudinal row of such articles, a transparent longitudinally slidable inspection panel arranged in alinement with said row of articles, an aperture in said panel through which an article may be removed when the aperture is alined with the article, a door for said aperture hinged to said panel, said door having a cylindric hinge element pivotally mounted on said panel, a push rod mounted on said panel for movement transversely of the panel, a hinge locking element on said push rod, a spring urging said push rod to move in a direction to engage said hinge locking element with said hinge element, said hinge element supporting said locking element and push rod in an advanced position against the pressure of said spring when the door is in open position, and said hinge element having a recess which registers with said locking element when the door is in closed position and allows said push rod and hinge locking element to move to a retracted position with the locking element in locking engagement with the hinge element, a stationary frame means located adjacent a longitudinal edge of said panel, said frame means having sockets spaced longitudinally of said panel and adapted to receive a projecting end portion of said push rod when the push rod is moved to said advanced position, whereby the panel is locked against longitudinal movement, a rock shaft parallel with the panel, means on said rock shaft operably engageable with said push rod, and manually operable coin-controlled means for rocking said rock shaft.

8. In an article dispenser, the combination of a cabinet, means within the cabinet for supporting articles in a longitudinal row of such articles, a transparent longitudinally slidable panel arranged in the cabinet in alinement with said row of articles, said panel embodying a series of articulated panel sections, means forming a longitudinal guideway for said panel including a central section parallel with said row and end sections turned inwardly at the ends of said row, an aperture in said panel through which an article may be removed when the aperture is alined with the article, a door for said aperture, locking means normally locking said door in closed position, and coin-controlled means for unlocking said locking means.

9. A flexible panel embodying a series of articulated panel sections, each comprising two complementary halves joined together to form an approximately rectangular cell, a thin tongue terminating in a cylindric tongue head projecting from one longitudinal edge of said panel section, and a cylindric socket adapted to pivotally receive the tongue head of an adjacent panel section formed between the two halves of the panel section at its opposite longitudinal edge.

10. A dispenser for articles embodying the combination of a plurality of inclined article chutes adapted to feed articles transversely into a longitudinal row, a transparent longitudinally slidable inspection panel arrangement in alinement with said row of articles, an aperture in said panel through which an article may be removed when the aperture is alined with the article, and coin-controlled closure means for said aperture.

11. A dispenser for articles embodying the combination of a plurality of inclined article chutes adapted to feed articles transversely into a longitudinal row, a transparent longitudinally slidable inspection panel arrangement in alinement with said row of articles, an aperture in said panel through which an article may be removed when the aperture is alined with the article, a guard plate extending from said panel between the article of said transverse row with which the aperture is alined and the article in the chute immediately above said article, and coin-controlled closure means for said aperture.

12. A dispenser for articles embodying the combination of a plurality of inclined article chutes adapted to feed articles transversely into a longitudinal row, a transparent longitudinally slidable inspection panel arrangement in alinement with said row of articles, an aperture in said panel through which an article may be removed when the aperture is alined with the article, a hinged door on said panel for closing said aperture, a depending guard plate pivotally mounted on said panel and adapted to extend from said panel between the bottom and next to the bottom articles in the chute with which the door aperture is alined, and an operative connection between said hinged door and said pivoted guard plate causing said guard plate to swing into position between said bottom and next to the bottom articles when the door is opened and to be removed from between said articles when the door is closed.

13. A dispenser for articles embodying the combination of means for supporting a plurality of articles in a longitudinal row, a transparent longitudinally slidable inspection panel arranged in alinement with said row of articles, an aperture in said panel through which an article may be removed when the aperture is alined with the article, guard means between adjacent articles of said row adapted to prevent any article but the one with which the aperture is alined from being extracted through the aperture, and coin-controlled closure means for said aperture.

14. A dispenser for articles embodying the combination of a plurality of inclined article chutes adapted to feed articles transversely into a longitudinal row, each of said chutes embodying inclined longitudinal side rods, vertical supporting rods connected to said side rods, and a trackway mounted in an inclined position at either of two elevations on said side rods, a transparent longitudinally slidable inspection panel arrangement in alinement with said row of articles and provided with an aperture through which an article may be removed when the aperture is alined with the article.

HOWARD E. ANTHONY.